United States Patent [19]
Dombrowski

[11] Patent Number: 4,797,673
[45] Date of Patent: Jan. 10, 1989

[54] DRIVER ALERTING DEVICE

[75] Inventor: Anthony E. Dombrowski, Omaha, Nebr.

[73] Assignees: Steven F. Sommers, Omaha; Bruce E. Schreiner, Grand Island; Land Paving Company, Omaha; Omni Holding Company, Omaha; Jerry Ronk, Omaha; Robert Wichser, Omaha, all of Nebr.

[21] Appl. No.: 178,778

[22] Filed: Apr. 1, 1988

Related U.S. Application Data

[63] Continuation of Ser. No. 895,535, Aug. 13, 1986, abandoned, which is a continuation of Ser. No. 646,838, Sep. 4, 1984, abandoned, which is a continuation-in-part of Ser. No. 579,160, Feb. 10, 1984, abandoned.

[51] Int. Cl.$^4$ .............................................. G08G 1/00
[52] U.S. Cl. ...................... 340/904; 340/903; 340/901; 340/52 H; 367/909; 180/169
[58] Field of Search ............ 340/904, 903, 52 H, 340/53, 901; 367/909; 180/169

[56] References Cited

U.S. PATENT DOCUMENTS

| | | | |
|---|---|---|---|
| 2,974,304 | 3/1961 | Norlund | 367/112 |
| 3,226,673 | 12/1965 | Cudworth | 367/112 |
| 3,732,555 | 5/1973 | Strenglein | 340/904 |
| 3,760,415 | 9/1973 | Holmstrom et al. | |
| 3,781,879 | 12/1973 | Staras et al. | |
| 3,789,950 | 2/1974 | Strenglein | 340/61 |
| 3,984,836 | 10/1976 | Oishi | 340/903 |
| 4,001,823 | 1/1977 | Matsui | 343/7 VM |
| 4,015,232 | 3/1977 | Sindle | 340/904 |
| 4,260,980 | 4/1981 | Bates | |
| 4,278,962 | 7/1981 | Lin | 340/904 |
| 4,300,116 | 11/1981 | Stahovec | |
| 4,356,489 | 10/1982 | Hirota | 343/7 VM |
| 4,358,759 | 11/1982 | Stewart et al. | |
| 4,404,541 | 9/1983 | Kodera et al. | 340/904 |
| 4,528,563 | 7/1985 | Takeuchi | 340/904 |
| 4,543,577 | 9/1985 | Tachibana et al. | |

OTHER PUBLICATIONS

Bureau of Mines Publication published in 1986 titled "Improved Back-Up Alarm Technology for Mobile Mining Equipment".

Primary Examiner—Donnie L. Crosland
Attorney, Agent, or Firm—Sherman and Shalloway

[57] ABSTRACT

An alarm device for a construction vehicle including a transceiver adapted for mounting at the rearward end of a vehicle for directing its wave output rearwardly of the vehicle. Return wave signals for many objects within the transceiver range are picked up and supplied to the transceiver by an antenna. Any resultant doppler shift signal is amplified for driving an audio alarm positioned on the vehicle. The circuit is adapted for electrical connection to the reverse gear of the vehicle for activation only when the vehicle transmission is engaged in reverse gear.

9 Claims, 1 Drawing Sheet

DRIVER ALERTING DEVICE

CROSS REFERENCE TO RELATED APPLICATION

This is a continuation patent application of my copending patent application Serial No. 895,535 filed Aug. 13, 1986, now abandoned which is a continuation of application Ser. No. 646,838, filed Sept. 4, 1984, now abandoned, which is a continuation-in-part of application Ser. No. 579,160, filed Feb. 10, 1984, now abandoned.

BACKGROUND OF THE INVENTION

The present invention is directed generally to a device for alerting the driver of a rearwardly moving vehicle to the presence of any object in close range behind the vehicle. More particularly, the present invention is directed to a micro-wave radar device using the doppler shift principle to detect the presence of a moving target within the transceiver range.

The federal government presently requires that construction equipment such as tractors, trucks, graders, dozers, etc. have a loud audio alarm mounted thereon which constantly sounds when the equipment is being moved in a rearwardly fashion. The audio alarm is incorporated or connected to the reverse gear of the transmission so that the alarm will immediately sound when the vehicle is placed in reverse gear. A problem associated with the constantly sounding alarm is that operators of the equipment are experiencing hearing damage due to the fact that the alarm must be loud enough so as to overcome the background noise. A further problem associated with the present alarm is that the alarms are activated for such long periods of time that persons working in the vicinity of the construction equipment become immune or inattentive to the alarm.

It is therefore a principal object of the invention to provide an alarm device for construction equipment which is activated only when an object or person is behind the equipment and the equipment is about to be or is being moved rearwardly.

A further object of the invention is to provide an improved device for alerting the driver of a rearwardly moving vehicle to the presence of a person or object within a short range distance behind the vehicle as well as alerting the person or object who is within the short range distance behind the vehicle.

Finally, an object is to provide an alarm device for construction equipment which is economical of manufacture, simple and rugged in construction and efficient in operation.

SUMMARY OF THE INVENTION

The alarm device of the present invention includes a transceiver adapted for mounting at the rearward end of the construction equipment for directing its wave output rearwardly of the equipment. Return wave signals from any object within the short transceiver range behind the equipment are supplied to the transceiver through an antenna connection. Any resultant doppler shift signal is amplified for driving the audio alarm. The circuit of the device is activated only when the vehicle transmission is engaged in reverse gear.

The alarm thus immediately sounds an alarm when any moving or stationary object is detected within the short transceiver range behind a rearwardly moving piece of equipment upon which it is installed. Even when the equipment is stationary, the device will signal the presence of any moving object within the transceiver range when the equipment is in reverse gear.

DESCRIPTION OF THE PREFERRED EMBODIMENT

Figure 1:
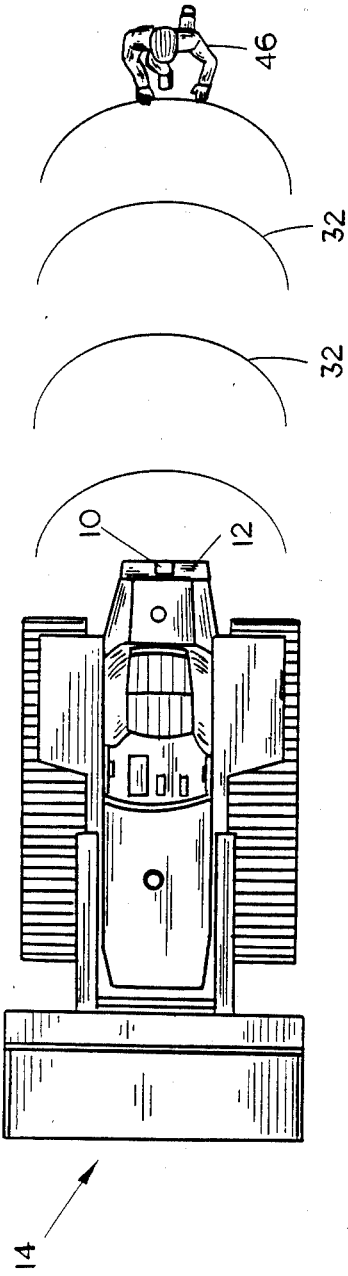
FIG. 1 is a diagrammatic top plan view of the alarm device of this invention installed on construction equipment.

The alarm device of this invention is indicated generally at 10 in FIG. 1 installed on the rear 12 of a piece of construction equipment 14. Device 10 operates by micro-wave radar using the doppler shift principle to detect the presence of a moving target within the transceiver range.

Figure 2:
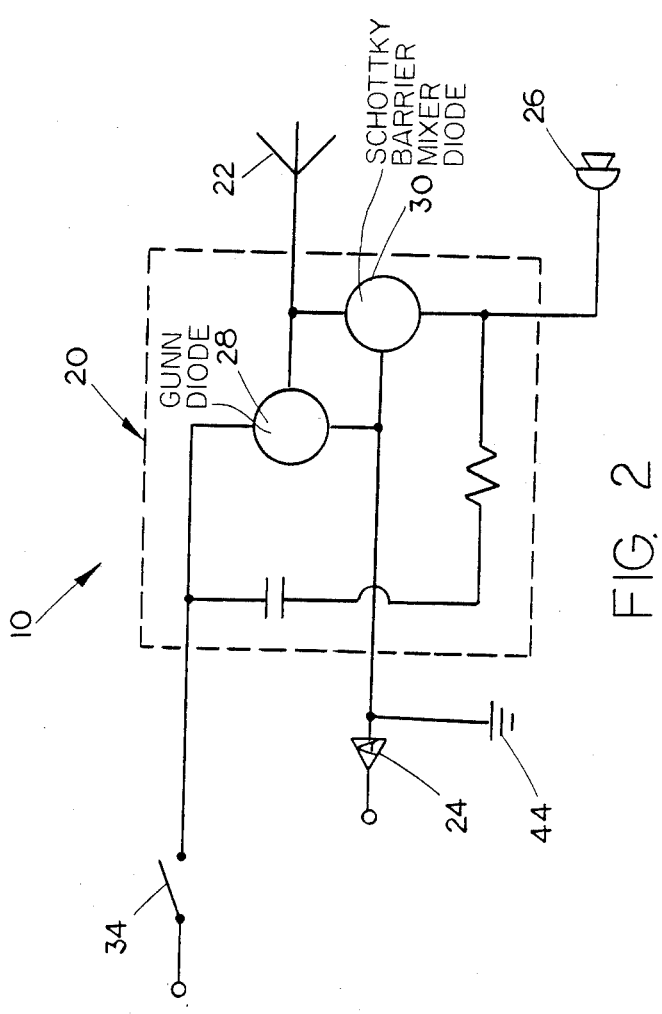
FIG. 2 is an electrical schematic circuit diagram of the alarm device of this invention.

The operating elements of the device 10 are wholly electronic and are shown in FIG. 2 as including a transceiver 20, an antenna 22, an intermediate frequency amplifier 24 and an audio alarm 26.

The transceiver 20 includes a gunn diode 28 mounted in a wave guide cavity which acts as the transmitter and local oscillator, together with a schottky barrier mixer diode 30 for the receiver. Electromagnetic radiation transmitted from the gunn diode 28 is reflected back at the antenna by any object within the transceiver range. If that object is moving relative to the vehicle, the frequency shift of the wave reflected by the moving object is measured electronically and triggers activation of the alarm 26.

In the preferred embodiment, output frequency of the transceiver 20 is factory preset at 10.525 GIGA HERTZ. Power output is 5 milliwatts minimum. Operating voltage is 8 volts D.C. The resultant doppler frequency obtained is 31.39 HERTZ for each mile per hour of radio velocity. The transceiver is unaffected by the presence of magnetic fields, noise, light and varying weather conditions.

Antenna 22 may be provided as either a high gain antenna or low gain antenna. The high gain antenna is preferred for application with ¼ ton, ½ ton and 1 ton vehicles measuring 80 inches maximum in width. The low gain antenna is preferred on 1 ton and larger vehicles measuring 80 inches and greater in width. The range of the antennas is adjustable and may be user set to accommodate virtually any vehicle. This adjustment is incorporated in the intermediate frequency amplifier 24 and is accessible from the outside of the unit. Antenna 22 is preferably constructed of machined aluminum and is also preferably flange-mounted directly to the transceiver 20, thus eliminating the effects of noise and spurious response. Lines 32 in FIG. 1 illustrate an example of a typically adjusted wave pattern.

The intermediate frequency amplifier 24 is a solid state, multi-stage operational amplifier designed to amplify and shape the resultant doppler shift signal. The circuitry is card mounted and has built-in range and sensitivity controls. The amplifier is designed to interface with the existing reverse switch 34 (FIG. 2) in order to activate the circuit only during reverse operation of the equipment. Reverse switch 34 is typically associated with the transmission of the equipment in conventional fashion.

The audio alarm 26 is mounted near the operator's station 16 so as to be readily audible to the driver of the equipment and readily audible to anyone positioned behind the equipment. Amplifier 24 drives both the audio alarm 26 and a light emitting diode mounted on the unit. The purpose of the light emitting diode is to aid in the adjustment of the unit in the event that the alarm is not audible to the one adjusting the unit.

Figure 3:
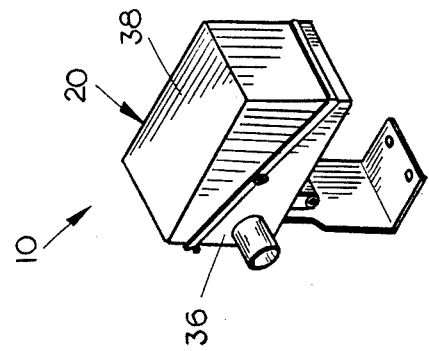
FIG. 3 is a perspective view of the transceiver housing of the invention.

The transceiver 20 is shown in FIG. 3 as including a housing 36 which is diagonally sectioned to provide a pivotal top cover 38. The wave output from the transceiver 20 is transmitted outwardly through a rearwardly protruding channel section 40 on the rear wall of housing 36. A mounting flange 42 extends downwardly from the housing for ready attachment to a vehicle bumper or the like.

The circuitry is card mounted and all components are treated with a conformal coating to prevent the effects of moisture and salt. Electrical hook-up to the vehicle is achieved via a splash-proof four circuit connector mounted on the side of the unit. One of the four leads may be connected to the ignition switch of the equipment, one to the back-up lights or reverse switch 34 on the transmission, one to ground 44 and one to the alarm 26.

The audio alarm is preferably a solid state piezoelectric alarm capable of developing 80 decibels at 12 volts D.C.

In operation, the transceiver 20 is activated to transmit electromagnetic radiation whenever the vehicle ignition is on and the transmission is engaged in reverse gear. This closes the vehicle reverse switch 34. A reducer may be provided between the transceiver 20 and reverse switch 34 to adjust the operating voltage to 8 volts D.C. The transceiver range spans the width of the equipment 14 and extends rearwardly approximately 6 to 12 feet. The maximum range would be approximately 20 feet.

As the equipment is driven rearwardly, reflected signals from any object within the transceiver range, such as a person 46, are picked up by antenna 22 and supplied to the mixer diode 30 where the frequency shift is measured electronically. Amplifier 24 is designed to amplify and shape the resultant doppler shift signal and to activate the alarm 26. Note that when the vehicle is backing up, both stationary and moving objects within the transceiver range will be detected since there will be relative movement between the transceiver and these objects. Even when the vehicle is stationary, a moving object, such as a person, will be detected by the transceiver and result in activation of the alarm when the vehicle transmission is in reverse. A stationary object will not be detected when the vehicle is stationary since there is no relative movement to cause a doppler shift signal to be generated. Thus, the alarm will stop once the moving object leaves the transceiver range. Likewise, when the audio alarm is activated by a stationary object, it will stop once the vehicle is stopped.

Thus it can be seen that a novel alarm device has been provided for construction equipment which is only activated when the transmission of the equipment has been placed in reverse and the device senses a moving object or when the equipment is being backed up and the sensor senses either a moving or stationary object within the transceiver range.

Thus there has been shown and described an alarm device for construction equipment which accomplishes at least all of the stated objects.

I claim:

1. An alarm device for construction equipment, comprising, a transceiver comprising a micro-wave radar device using the doppler shift principle to detect the presence of a target within the transceiver range, means for supporting said transceiver at the rearward end of the equipment for directing the wave output thereof rearwardly of the equipment, means for supplying to said receiver return wave signals from any target within the transceiver range, an intermediate frequency amplifier operatively connected to said transceiver, said amplifier being operative to amplify and shape said return wave signals, an indicator on the equipment, means for electrically connecting said indicator to said transceiver for activation of said audible indicator in response to detection by said transceiver of return wave signals from any target within the transceiver range, and means for operatively electrically connecting said transceiver to means associated with the transmission of the equipment whereby said transceiver will only be activated in response to the transmission of said equipment being placed in reverse gear, said device being substantially unaffected, in operation, by varying weather conditions.

2. The alarm device of claim 1 wherein said transceiver includes a wave guide cavity and a gunn diode mounted in said wave guide cavity for transmitting wave output therefrom.

3. The alarm device of claim 2 wherein said transceiver further includes a schottky barrier mixer diode which is operative as the receiver thereof.

4. The alarm device of claim 1 wherein said means for supplying return wave signals to said transceiver comprises a high gain antenna.

5. The alarm device of claim 1 wherein said means for supplying return wave signals to said transceiver comprises a low gain antenna.

6. The alarm device of claim 1 wherein said means for supplying return wave signals to said transceiver comprises an antenna mounted directly to the transceiver.

7. The alarm device of claim 1 wherein said intermediate frequency amplifier is a solid state multi-stage operational amplifier.

8. The alarm device of claim 1 wherein said indicator comprises a solid state piezoelectric alarm.

9. In combination, a construction vehicle having forward and rearward ends, a reverse gear, and a driver alerting device, comprising a transceiver comprising a micro-wave radar device using the doppler shift principle to detect the presence of a target within the transceiver range, means for supporting said transceiver on the rearward end of said vehicle for directing the wave output of the transceiver rearwardly of the vehicle, antenna means for supplying to the transceiver return wave signals from any target within the transceiver range, an indicator, means for mounting said indicator on the vehicle, means for electrically connecting said indicator to said transceiver for activation of said indicator in response to detection by said transceiver of return wave signals from any target within the transceiver range, said means for electrically connecting said remote audible alarm to said transceiver including an intermediate frequency amplifier operative to amplify and shape the output signal of the transceiver, and means for electrically connecting said transceiver to means associated with the reverse gear of the vehicle for activation of said transceiver in response to said vehicle being placed in said reverse gear, said device being substantially unaffected, in operation, by varying weather conditions.

* * * * *